United States Patent [19]
Heller

[11] Patent Number: 5,992,900
[45] Date of Patent: Nov. 30, 1999

[54] PRESSURE ACTUATED PIPE SWIVEL JOINT

[76] Inventor: Chester Markmann Heller, 2411 N. 54th St., Philadelphia, Pa. 19131-2423

[21] Appl. No.: 08/864,933

[22] Filed: May 29, 1997

[51] Int. Cl.⁶ .................................................... F16L 35/00
[52] U.S. Cl. ............................... 285/114; 285/226; 92/34; 92/43; 137/12; 138/121
[58] Field of Search ............................ 138/121; 285/226, 285/114, 301; 92/34, 43; 251/59; 137/12

[56] References Cited

U.S. PATENT DOCUMENTS

| | | | |
|---|---|---|---|
| 2,563,899 | 8/1951 | Wiancko | 171/119 |
| 2,857,175 | 10/1958 | Browning et al. | 285/114 X |
| 2,867,242 | 1/1959 | Harris et al. | 285/226 X |
| 3,082,795 | 3/1963 | Heller | 138/121 |
| 3,096,104 | 7/1963 | Browning | 285/226 |
| 3,318,335 | 5/1967 | Heller | 138/121 |
| 3,463,011 | 8/1969 | Wehde et al. | 73/418 |
| 4,108,050 | 8/1978 | Paynter | 92/48 |
| 4,243,253 | 1/1981 | Rogers | 285/114 X |
| 5,033,270 | 7/1991 | Hardt | 60/632 |

*Primary Examiner*—Dave W. Arola
*Attorney, Agent, or Firm*—Louis Weinstein

[57] ABSTRACT

A packless swivel joint capable of rotation without the necessity for a mechanical drive includes a hollow tubular member provided with helical corrugations of tight pitch and a corrugation pitch to corrugation with ratio of between two to one to three to one which unwinds to the application of only internal pressure. A limit stop may be provided to limit the amount of unwinding. Annular-shaped bellows of a circular cross section can be utilized to absorb lengthening of the swivel joint in applications where lengthening is to be prevented. In one preferred embodiment, the helical corrugation is preferably continuous.

7 Claims, 4 Drawing Sheets

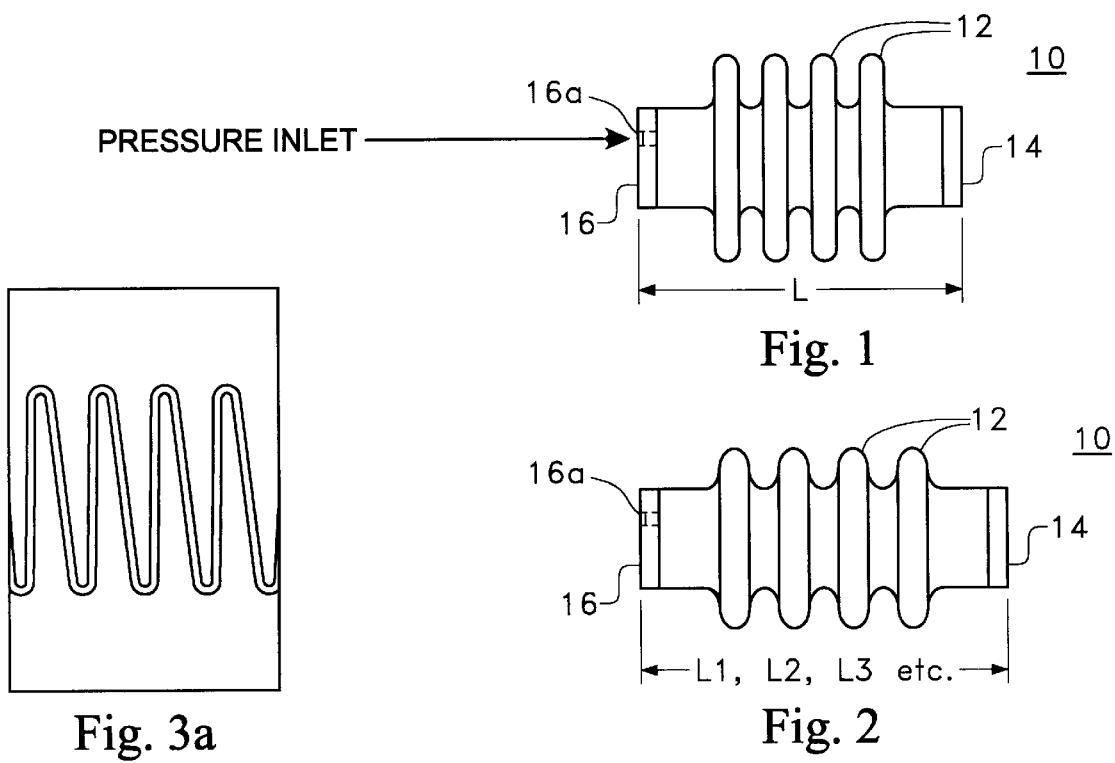
Fig. 1
Fig. 3a
Fig. 2
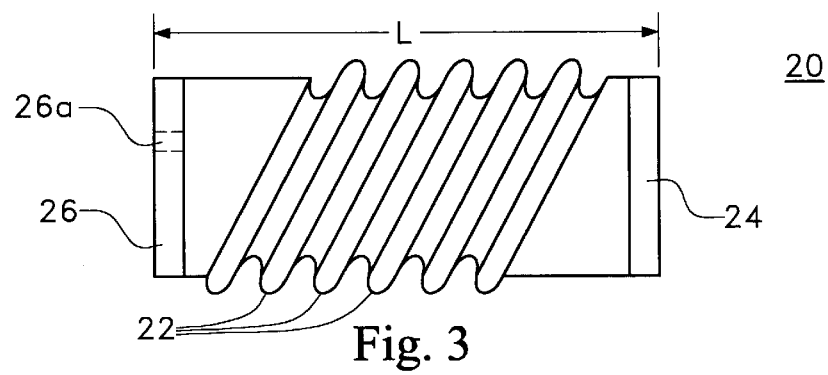
Fig. 3
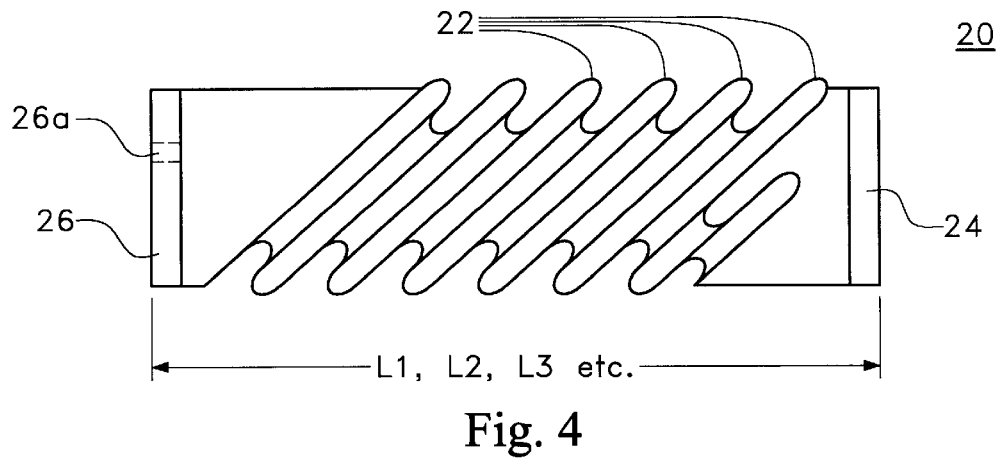
Fig. 4

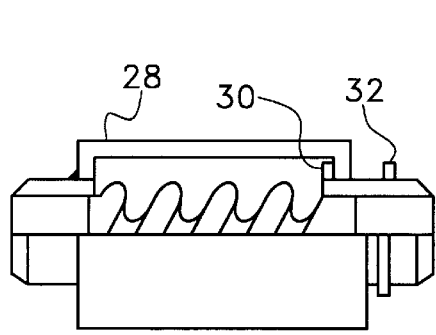
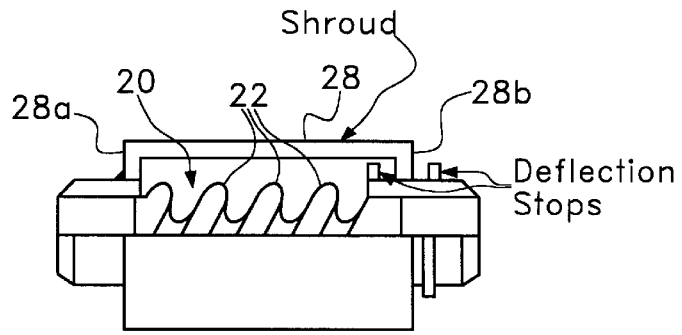
Fig. 5     Fig. 6
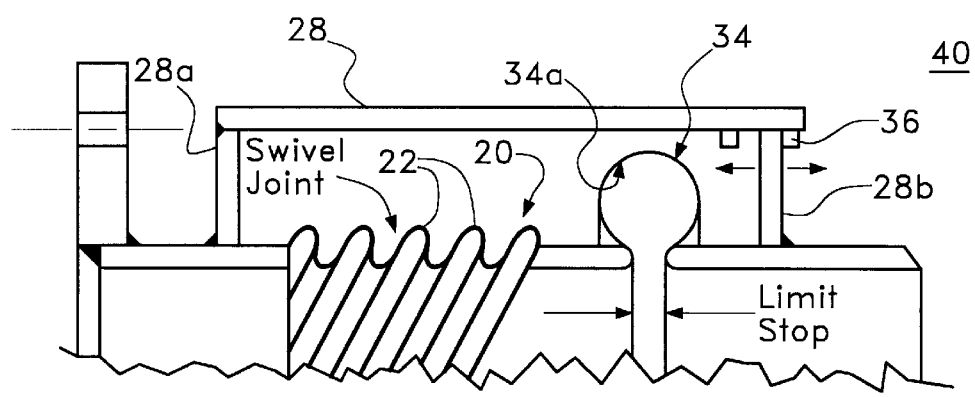
Fig. 7
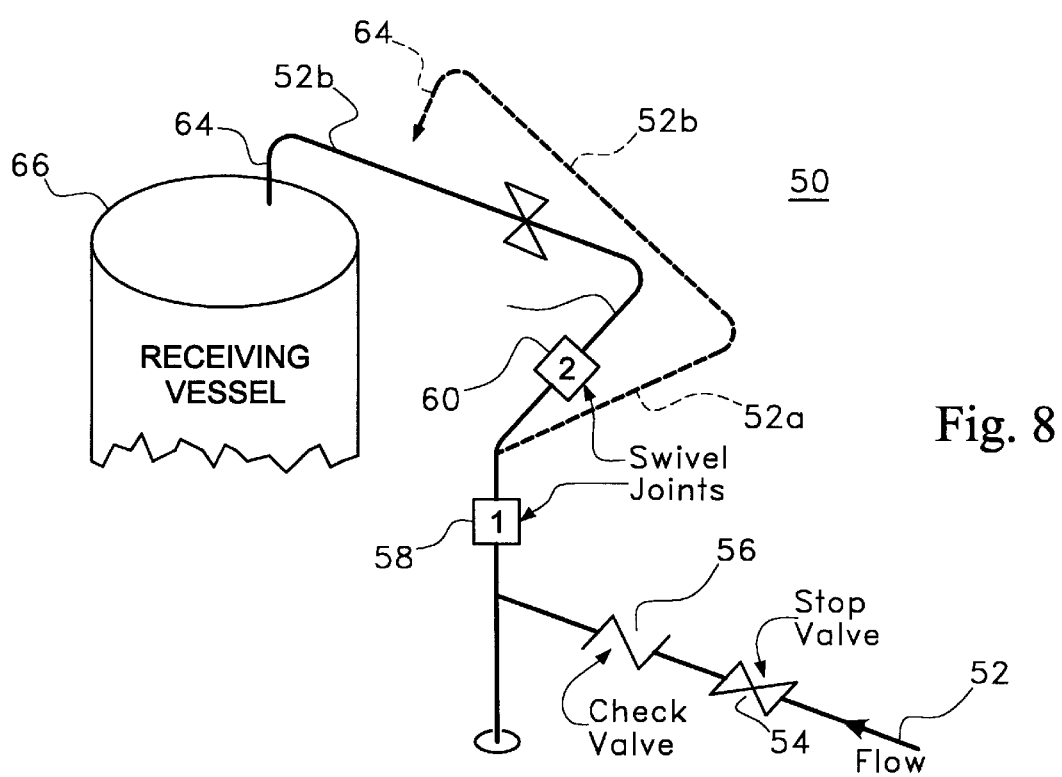
Fig. 8

PRESSURE ACTUATED PIPE SWIVEL JOINT

FIELD OF THE INVENTION

The present application relates to swivel joints and more particularly to pressure activated packless-type, pipe swivel joints.

BACKGROUND OF THE INVENTION

All tubular and pipe devices which are, by any means, mechanically or hydraulically formed to a pre-determined configuration, have been long known, through the principles of physics, to react to an opposite and secondary configuration when subjected to an internally applied static or dynamic pressure of sufficient intensity.

A principle example of the above-stated fact is the well-known metallic bellows. Making reference to the metallic bellows arrangement 10 shown in FIG. 1, there is provided therein a plurality of annually formed corrugations 12. The corrugations are formed by simultaneous and concurrent outward bulging and compression of the tube from which they are formed. The established forming techniques produce the bellows 10 shown in FIG. 1.

The right-hand end of bellows 10 of FIG. 1 is shown being sealed at 14 and the left-hand end is provided with the bellows 14 having a pressure inlet opening 14a.

By application of internal pressure through the pressure inlet 16a the original configuration of the corrugations 12 are altered to an opposite or secondary configuration as shown in FIG. 2.

More specifically, the original length L of the bellows 10 shown in FIG. 1 is forcibly extended to a predictable length, such as L1, L2 or L3 as shown in FIG. 2, which length is dependent upon the intensity of internal pressure applied as well as the inherent characteristics of the bellows which include, to name a few, the nature of the material, ductility, hardness, thickness, tube diameter, effective area and number of corrugations. All tests show confirmation of the action of the bellows to all principles of physics.

When applied in a piping system, such bellows constitute the major component of industrial expansion joints. In such piping systems it is commonly necessary to limit the allowable compression and tensile defections of the bellows by external means such as anchors provided at the pipe terminals and directional changes, or by means of external tie-rods, hinges, gimbals and the like, which are provided across the length of the bellows.

The above principles of physics are directed to annually formed corrugations of a bellows, which corrugations each lie in a plane substantially perpendicular to the longitudinal axis of the integral tube or pipe, as shown in FIGS. 1 and 2.

It is desirable to use the above technology to provide a swivel joint. Conventional commercially—marketed swivel joints, which are typically of the packed type, may be manually rotated in smaller sizes, but, due to frictional resistance within their packing gland, larger sizes require motorized and/or gear assistance for activation. It is thus desirable to provide a pressure-activated pipe swivel joint of the packless type which eliminates the need for a motor drive.

BRIEF DESCRIPTION OF THE INVENTION

The present invention, in which the principles of physics are continued, is characterized by comprising a hollow tube with helical, closely-wound corrugations. This configuration, in true effect, acts in a manner structurally equivalent to a compressed torsion spring integrally displaced within the tube.

By introduction of internal pressure, the end sealed tube having helical corrugations, under-goes lengthening and unwinding due to the application of pressure alone, thus avoiding the need for a motor drive.

OBJECTS OF THE INVENTION

It is therefore one object of the present invention to provide a packless swivel joint which is pressure-activated and thus does not require a motor drive.

Still another object of the present invention is to provide a pressure-activated packless-type pipe swivel joint employing helical corrugations.

Still another object of the present invention is to provide a pressure actuated packless pipe swivel joint having continuous helical corrugations.

Still another object of the present invention is to provide a novel pressure-activated packless-type swivel joint having helical corrugations which are narrow, close-pitched and tightly wound, enabling torsionally actuated rotation of the coupling through internal pressure alone.

BRIEF DESCRIPTION OF THE FIGURES

The above as well as other objects of the present invention will become apparent while reading the accompanying description and drawings in which:

FIG. 1 shows a conventional design of a bellows having annular corrugations.

FIG. 2 shows the manner in which the length of the bellows of FIG. 1 may be lengthened through the application of internal pressure.

FIGS. 3 and 3a each show preferred embodiments of a pipe swivel joint embodying the principles of the present invention.

FIG. 4 shows the manner in which the swivel joint of FIG. 3 is untwisted and lengthened.

FIG. 5 shows a swivel joint of a type shown in FIGS. 3 and 4 provided with an arrangement for limiting torsional deflection.

FIG. 6 shows the arrangement of FIG. 5 in which the swivel joint is located in an intermediate position.

FIG. 7 is a view showing a swivel joint combined with an arrangement for limiting axial lengthening.

FIGS. 8 through 10 show a plurality of piping configurations employing at least one or more swivel joints embodying the principles of the present invention.

DETAILED DESCRIPTION OF THE INVENTION AND PREFERRED EMBODIMENTS THEREOF

Figure 9:
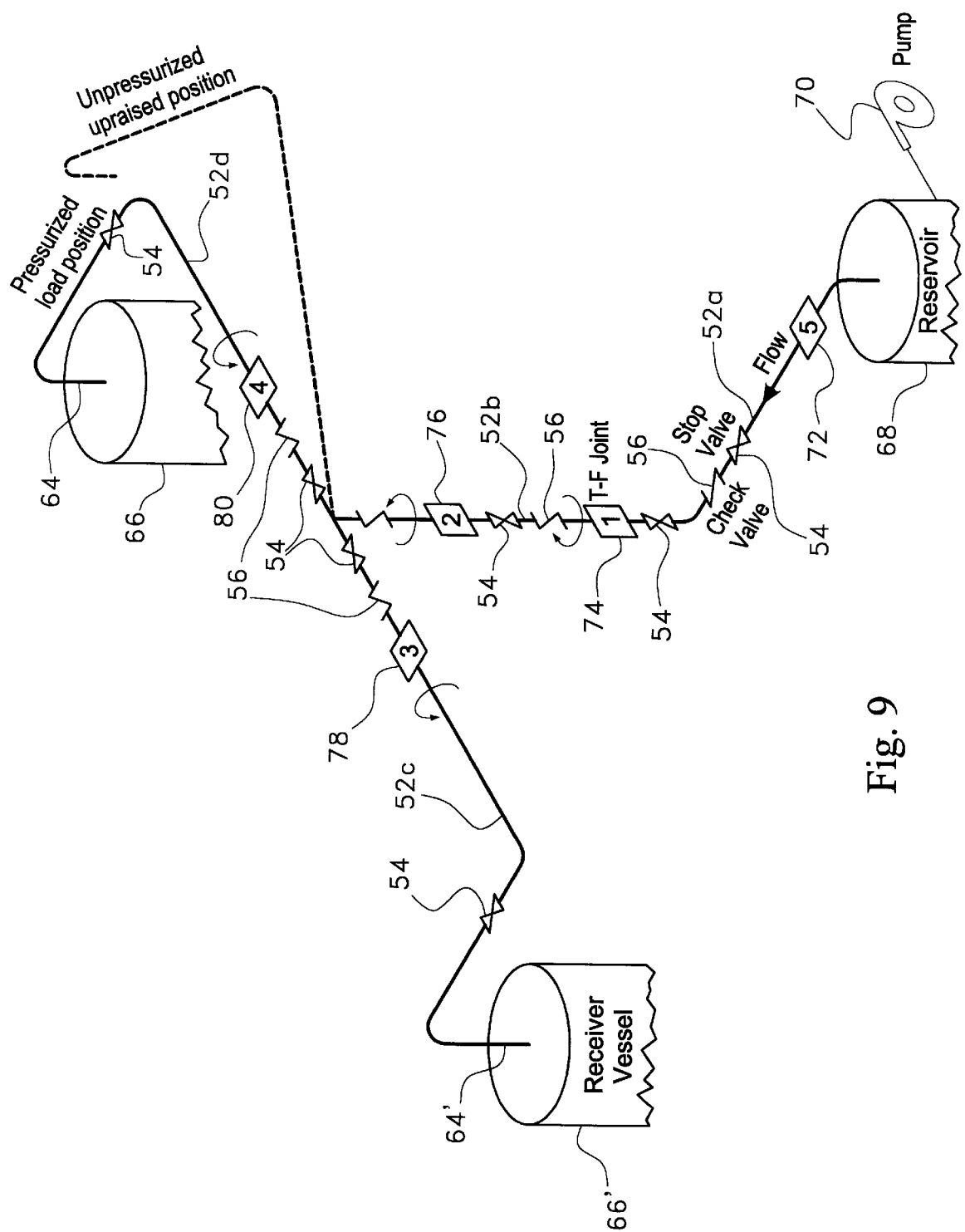

FIG. 3 shows an embodiment 20 of the present invention provided with a plurality of helical, closely wound corrugations 22, which configuration acts in much the same way as a compressed torsional spring integrally displaced along the tube.

Introducing internal pressure through pressure inlet 26a (with the opposite end having an end closure 24) alters the original configuration causing the helical corrugations 22 to unwind and causing the embodiment 20 to be lengthened, as shown in FIG. 4.

The original length L in FIG. 3 is extended to a predictable minor amount L1, L2, L3 and so forth, which predicable amount is dependent upon the amount of internal pressure applied, the number of helical windings, the metallic material, tube diameter etc.

As was mentioned hereinabove, smaller size swivel joints having packing glands maybe capable of being manually rotated. However due to the frictional resistance provided by a packing gland, larger-sized packed swivel joints require motorized and geared assistance for appropriate activation. The packless swivel joint of the present invention requires no such motorized assistance since pressure alone is sufficient to actuate the packless swivel joint.

FIG. 3a shows a development view of the preferred arrangement of the corrugations 12 wherein what may be considered to be the terminating end of each corrugation is joined to the terminating end of each adjacent corrugation so as to provide a corrugation arrangement which may be considered to be a single, continuous corrugation. Noting, for example, the upper ends of the adjacent corrugations 12 and 12' are joined together by a substantially U-shaped corrugation section 12a. Similarly, the adjacent corrugations 12' and 12" are joined at their lower ends by a substantially U-shaped corrugation section 12b. This pattern is respectively repeated for every other pair of helical corrugations at the upper end and likewise for every other pair of helical corrugations at the lower end so as to effectively produce one continuous corrugation. The ratio of corrugation pitch to corrugation width can be one-to-one and as much as two-to-one to three-to-one, etc.

The packless swivel joint of the present invention may be utilized in piping systems, loading arms and the like. When the swivel joint of the present invention is utilized in such arrangements, it is often necessary to limit the allowable torsional deflection as well as the lengthening or shorting of the initially pre-wound tube. This is accomplished by incorporating a dual-purpose, rigid tubular shroud which functions as a limit stop and thus restricts allowable limits of torsion, extension and compression through the use of internal and/or external mechanical stops. As shown in FIGS. 5 and 6, the helical corrugations of the swivel joint 20 are enclosed in a cylindrical-shaped metallic shroud 28. The end 28a of shroud 28 is secured to a tubular portion of the swivel joint just to the left of the helical corrugations 22 while the right-hand end 28b is displaced from the tubular portion just to the right of the helical corrugations 22, the amount of displacement being sufficient to enable slidable movement of the righthand end 28b relative to the tubular portion of the swivel joint which it encircles.

First and second stops 30 and 32 are provided at spaced distances respectively to the left and to the right of end 28b.

FIG. 6 shows the end 28b positioned substantially intermediate to the stops 30 and 32. Common in current state-of-the-art practice, rather than the pre-fixed, stationary deflection stops shown in FIGS. 5, 6 & 7, other forms of mobile and/or adjustable elongation and shortening limiting stops may be administered and incorporated which embody either manual or electronic controls, and are thus controllable before or during service operations of the piping system and its packless swivel joints. FIG. 5 shows the end 28b engaging stop 30 which occurs when the swivel joint is in its primal. The control of the increased length also controls the amount of unwinding experienced by the swivel joint. If desired, the right-hand stop 32 maybe eliminated.

In some applications, it is necessary to prohibit axial lengthening of the total swivel joint unit or assembly while continuing to permit unwinding. This is accomplished by the swivel joint assembly 40 shown in FIG. 7 which is comprised of a basic swivel joint 20 of the type shown, for example, in FIG. 3. A cylindrical-shaped shroud 28 encircles the swivel joint 20. The left-hand end 28a thereof is secured to a tubular portion of the swivel joint just to the left of the corrugations 22, preferably by welding. The right-hand end 28b of shroud 28 is secured to a tubular portion of the swivel joint just to the right of a bellows 34 arranged between right-hand end 28b and the right-hand end of the corrugations 22. Bellows 34 has a circular cross-sectional shape as shown in 34a which eliminates many of the stresses encountered in V and U-shaped corrugations. Bellows 34 easily absorbs the extension of the swivel joint 20 due to compression of the bellows. The bellows 34 resumes its nominal shape when the forces applied thereto are removed. Unlike conventional bellows as shown, for example, in FIG. 1 of the present application, the bellows 34 shown in FIG. 7 will accept a torsional deflection without the slightest distortion. When the embodiment 40 shown in FIG. 7 is pressurized, end 28b of shroud 28 is free to move relative to the right-hand end of shroud 28. A stop 36 may be provided along the inner-periphery of shroud 28 arranged on the right-hand side of end 28b to prevent lengthening of the swivel joint. If desired or necessary, more than one bellows 34 may be utilized.

Figure 10:
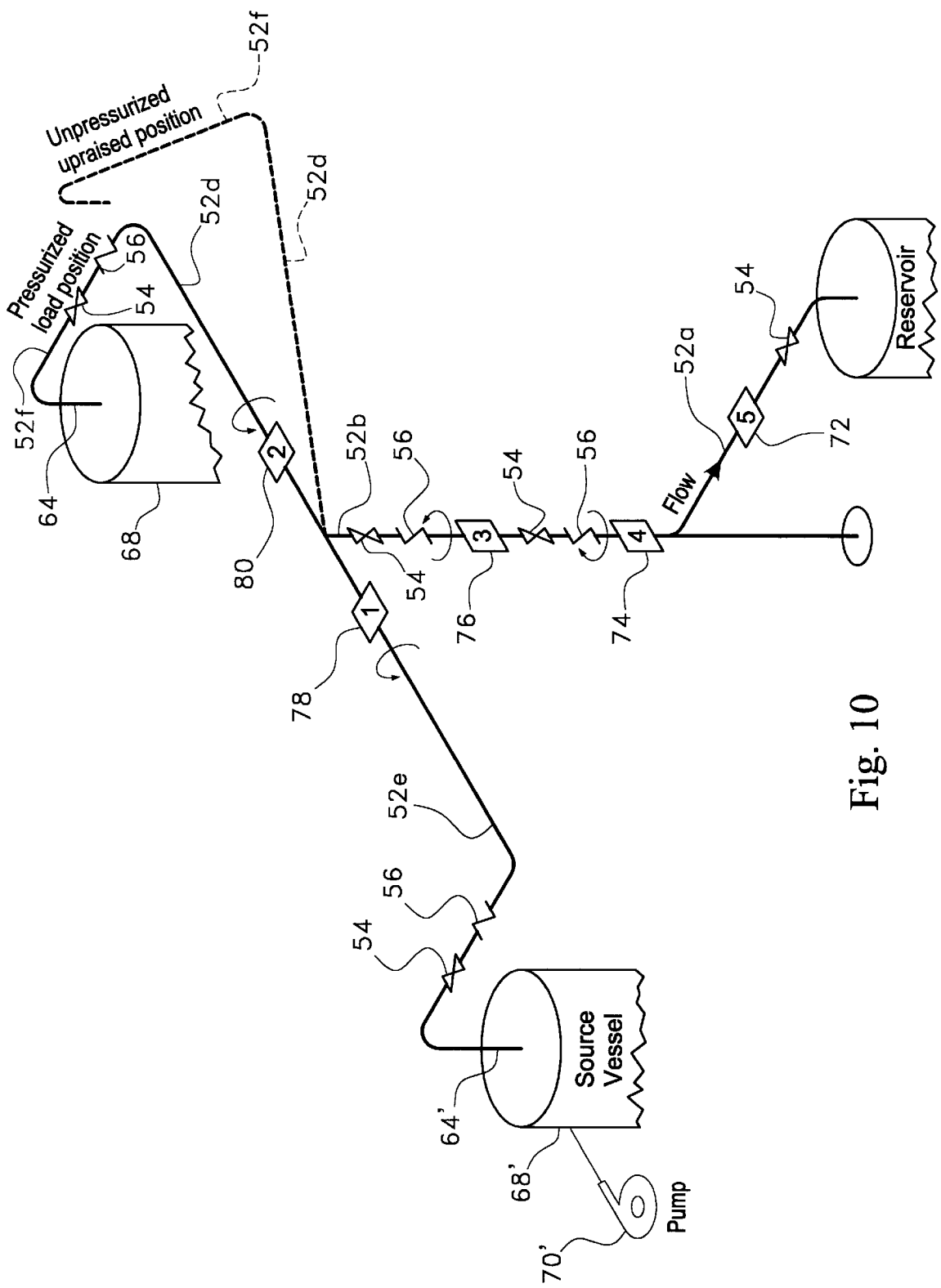

FIGS. 8 through 10 show a number of different applications for employing the bellows of the present invention. In the piping system 50 of FIG. 8, fluid under pressure is successively delivered through conduit 52, stop valve 54 and check valve 56 to vertically aligned swivel joint 58 and horizontally aligned swivel joint 60. Another stop valve 62 is provided downstream relative to swivel joint 60. The conduit extends beyond stop valve 62 and is provided with an outlet 64 for delivering the fluid to a receiving vessel 66. The swivel joints 58 and 60 embody the principles of the present invention.

Prior to the pumping of the fluid under pressure into the piping system, the swivel joint 58 is in its wound condition, maintaining conduit section 52a in the dotted-line position 52a' as shown. Similarly, swivel joint 60 is maintained in its wound condition causing the conduit section 52b to be maintained in the dotted line position 52b' as shown. When the fluid is pumped under pressure through the conduit, the swivel joint 58 unwinds rotating conduit section 52a from the dotted line position to the solid line position. Swivel joint 60 similarly unwinds rotating the piping section 52b from the dotted line position shown in FIG. 8 generally downwardly to the solid line position thereby positioning the outlet end 64a above receiving vessel 66.

The rotation of the swivel joints by internal pressure may, if desired, be effected by closing valve 62, whereupon the pressure builds up within swivel joints 58 and 60 to rotate the piping sections sufficiently to swing the delivery end 64 immediately above receiving vessel 66. If desired, an additional stop valve may be positioned between the swivel joints 58 and 60 and that stop valve, together with stop valve 62 may be sequentially operated so as to sequentially rotate the piping sections 52a and 52b. The swivel joints may be provided with limit stops of the type shown, for example, in FIG. 5.

When the desired quantity of fluid is delivered to receiving vessel 66, flow is halted, whereupon the swivel joints return to their normally wound state lifting the conduit 52b to a position above receiving vessel 64 (i.e. the dotted line position of section 52b) and further moving the outlet end 64 away from the receiving vessel due to the return of swivel joint 58 to its normally wound position.

FIGS. 9 and 10 show other arrangements wherein like elements as between FIGS. 9, 10 and FIG. 8 have been designated by like numerals. In the embodiment shown in FIG. 9, liquid is pumped from a reservoir 68 by pump 70 through a swivel joint 72 (needed occasionally) arranged along a horizontal section 52a and swivel joint 74 and 76 arranged along a vertical section of piping 52b. The plurality of stop valves 54 and check valves 56 are also arranged at spaced intervals along piping sections 52a and 52b. The riser pipe, 52b, branches into piping sections 52c and 52d each provided respectively with swivel joints 78 and 80 as well as stop valves 54 and check valves 56, as shown. The ends 64 and 64' of the piping sections are arranged to cooperate with vessels 66 and 66', respectively individually or in unison (collectively).

The swivel joints 78 and 80 operate substantially in the same manner as the swivel joint 60 (see FIG. 8) for respectively raising and lowering the delivery ends 64 and 64' relative to the receiver vessels 66 and 66'.

The swivel joints 74 and 76 are wound in opposing directions to respectively rotate the sections 52c and 52d either clockwise or counter clockwise.

The swivel joint 72 may be utilized to rotate entire pipe system for desired or drastic purposes (fire, earthquake, etc.).

The embodiment of FIG. 10 is similar to that shown in FIG. 9 with the exception that two vessels are provided to selectively deliver a liquid under pressure to a reservoir. Liquid under pressure is delivered from reservoir 68 under the control of pump 70. Similarly, vessel 68' delivers liquid under pressure under the control of the pump 70'. By selectively operating the pumps, the pump in operation may move the piping section associated with the pump and reservoir not in operation away from that reservoir. For example, assuming only pump 70' is in operation, stop valve 56 provided near the outlet end of piping section 52d may be closed. Liquid under pressure flowing into swivel joint 80 will rotate the section 52 from the solid line position upwardly to the dotted line position. The pressurized flow of the liquid through the swivel joints provided in the vertically aligned piping section 52b will rotate the piping section 52d clockwise from the solid line position to the dotted line position.

The operation of pump 70 with pump 70' turned off will provide substantially the same operation. Namely, by closing stop valve 54 in piping section 52e and pumping liquid under pressure from reservoir 68, the swivel joint 78 will operate to lift the piping section 52e' upwardly.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A swivel joint for use in a piping system for delivering a fluid comprising:
   a swivel joint for swingably moving a conduit coupled to a downstream and thereof, said swivel joint comprising:
      a hollow tubular member provided with corrugations arranged in a helical pattern and having a pitch sufficient to allow the helical pattern of corrugations to untwist upon the application of internal pressure within said swivel joint and limit stop means for limiting rotation of a downstream end of said swivel joint relative to an upstream end thereof.

2. The apparatus of claim 1 wherein said limit stop means comprises a projection provided on said swivel joint and arranged a spaced distance from a downstream end of said helical corrugations;
   a shroud-like enclosure encircling said helical corrugations and being secured to said swivel joint near an upstream end of said helical corrugations and having a downstream end extending radially inwardly toward said swivel joint and spaced therefrom so as to permit movement of said projection relative to a downstream end of said swivel joint; and
   said projection being engaged by said inwardly directed flange to limit further unwinding of said swivel joint.

3. A swivel joint for use in a piping system for delivering a fluid comprising:
   a swivel joint for swingably moving a conduit coupled to a downstream and thereof, said swivel joint comprising:
      a hollow tubular member provided with corrugations arranged in a helical pattern and having a pitch sufficient to allow the helical pattern of corrugations to untwist upon the application of internal pressure within said swivel joint and an annular bellows arranged between a downstream end of said helical corrugations and an adjacent downstream end of said swivel joint for absorbing axial expansion of said swivel joint corrugations; and
      means coupled to said swivel joint for preventing lengthening of said swivel joint in an axial direction whereby any lengthening is absorbed by said annular bellows.

4. The apparatus of claim 3 wherein said annular bellows has a circular cross-section of toroidal format.

5. A swivel joint for use in a piping system for delivering a fluid comprising:
   a swivel joint for swingably moving a conduit coupled to a downstream and thereof, said swivel joint comprising:
      a hollow tubular member provided with corrugations arranged in a helical pattern and having a pitch sufficient to allow the helical pattern of corrugations to untwist upon the application of internal pressure within said swivel joint, a pipe section being coupled to a downstream end of said swivel joint;
      said piping section having at least one bend to provide a downstream arm arranged transverse to an upstream arm;
      untwisting of said swivel joint providing swinging movement of said downstream arm with said bend as a pivot point for respectively moving an outlet end of said downstream arm between a first position in alignment with a receptacle for receiving a fluid delivered by said piping system and a second position displaced from said receptacle.

6. The apparatus of claim 5 further comprising a valve member adjustable between an open and closed position arranged in said piping system at a position downstream relative to said swivel joint for selectively closing said piping system to enable said helical section of said swivel joint to unwind during the application of internal pressure caused by pumping fluid into said piping system while said valve is closed.

7. A method for operating a swivel joint and a piping system comprising:
   a hollow tubular member provided with corrugations arranged in a helical pattern and having a pitch sufficient to allow the helical pattern of corrugations to untwist upon the application of internal pressure within said swivel joint and a stop valve located in the piping system beyond a downstream end of said swivel joint, said method for operating a swivel joint and a piping system comprising the steps of:

(a) initially closing said stop valve;

(b) pumping fluid through said piping system under pressure until said swivel joint unwinds at least a predetermined amount; and (c) opening said stop valve while continuing to feed fluid at a pressure through said piping system sufficient for delivery to a receptacle.

* * * * *